United States Patent [19]

Wakami et al.

[11] 4,127,881
[45] Nov. 28, 1978

[54] TRACKING CONTROL SYSTEM FOR MAGNETIC VIDEO RECORDING AND REPRODUCING SYSTEM

[75] Inventors: Noboru Wakami, Hirakata; Masahiro Deguchi, Yao, both of Japan

[73] Assignee: Matsushita Electric Industrial Co., Ltd., Japan

[21] Appl. No.: 733,123

[22] Filed: Oct. 18, 1976

[30] Foreign Application Priority Data

Oct. 21, 1975 [JP] Japan .............................. 50/127159
Nov. 12, 1975 [JP] Japan .............................. 50/136504
Dec. 16, 1975 [JP] Japan .............................. 50/150288
Dec. 16, 1975 [JP] Japan .............................. 50/150289
Jun. 11, 1976 [JP] Japan .............................. 51/69232

[51] Int. Cl.² .................... G11B 21/10; G11B 15/46
[52] U.S. Cl. ............................... 360/70; 360/77; 360/73; 360/75
[58] Field of Search ............... 360/77, 70, 73, 75; 318/576

[56] References Cited

U.S. PATENT DOCUMENTS

3,663,764  5/1972  Trost ....................................... 360/70
3,943,565  3/1976  Frank ...................................... 360/77

*Primary Examiner*—Bernard Konick
*Assistant Examiner*—Alan Faber
*Attorney, Agent, or Firm*—Stevens, Davis, Miller & Mosher

[57] ABSTRACT

A tracking control system for a magnetic video recording and reproducing system, in which a signal is recorded on a magnetic tape as record tracks at an angle with respect to the longitudinal direction of the tape and is reproduced therefrom by rotary magnetic heads. At the time of start of playback, the relative phase of scanning tracks of the rotary heads and the afore-said record tracks is automatically varied at a predetermined cycle. During the period of this variation, a phase position at which a maximum value of the level of the reproduced signal from the rotary heads is detected, and the phase variation is stopped at the detected phase position so as to let the scanning tracks of the rotary heads coincide with the record tracks.

9 Claims, 14 Drawing Figures

TRACKING CONTROL SYSTEM FOR MAGNETIC VIDEO RECORDING AND REPRODUCING SYSTEM

This invention relates to rotary head type magnetic video recording and reproducing systems (hereinafter referred to as VTR). More particularly, it concerns a construction for automatically controlling the tracking in playback to the optimum tracking state.

In the VTR, it is necessary that in playback the rotary heads accurately trace the record tracks of the signal recorded during recording. Accordingly, it has been the practice to record during recording a signal related to the vertical sync. signal of the video signal as a control signal (signal related to the rotational phase of the rotary heads) in the longitudinal direction of the tape and to use this control signal in playback for controlling the positional relation between the rotary heads and tape; that is, for tracking control such that the rotary heads trace the same tracks as at the time of recording. Hitherto, for adjusting the tracking to an optimum state where the rotary heads trace the record tracks most accurately, the phase of the reproduced control signal has been adjusted by manually adjusting the phase of a tracking shifter comprising a monostable multivibrator through a variable resistor to a position where the signal-to-noise ratio of image reproduction on a television screen is the highest.

However, this method of adjustment is very difficult for the ordinary user. Particularly, it is difficult to find a point corresponding to the highest signal-to-noise ratio, and this leads to insufficient adjustment and results in lowering of the quality of VTR reproduction. This constitutes a great drawback with regard to the handling of related apparatus.

This invention has for its object the provision of a tracking control system, which can automatically effect tracking control in playback to the optimum phase point, thus seeking to improve the operability of the related apparatus and contribute to improvement of the quality of reproduction.

The above and other objects, features and advantages of the invention will become more apparent from the following detailed description of preferred embodiments of the invention when the same is taken in conjunction with the accompanying drawings, in which.

Figure 1:
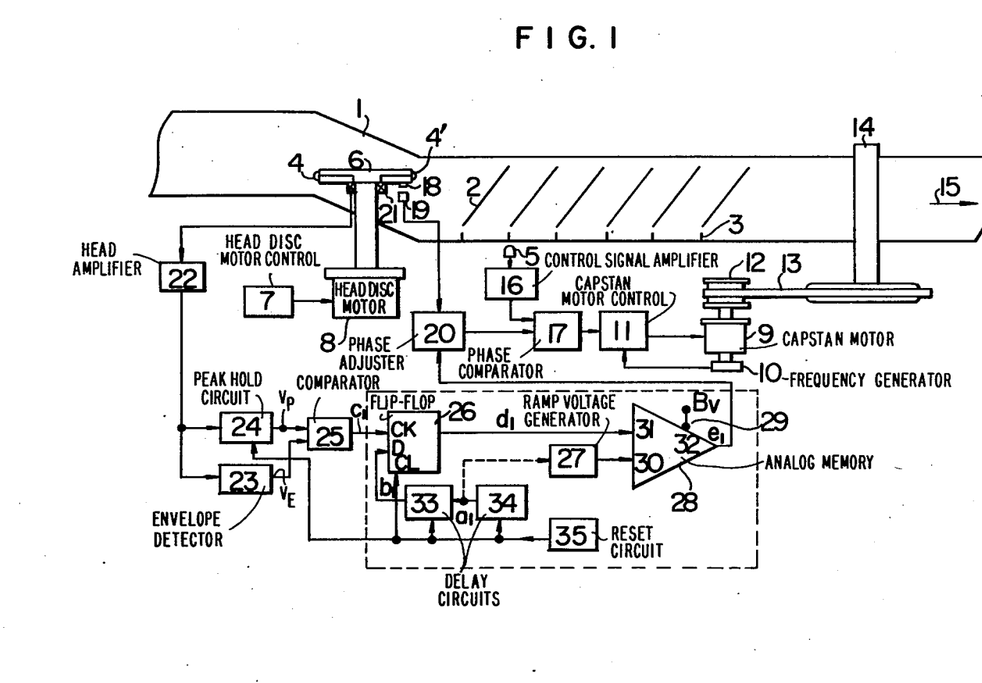
FIG. 1 shows a block diagram of an embodiment of the invention.

FIG. 1 shows an embodiment of the invention. In FIG. 1, there is shown a magnetic tape 1, on which frequency modulated video signal 2 and also control signal 3 to be used for tracking servo-control in playback in the usual way are recorded, and these signals are reproduced by rotary heads 4 and 4' and a stationary control signal head 5 respectively. The rotary heads 4 and 4' are mounted on a head disc 6 which is rotated at a constant r.p.m. by a head disc motor 8 controlled by a head disc motor control circuit 7. The magnetic tape 1, on the other hand, is driven in the direction of arrow 15 from a capstan motor 9, which includes a frequency generator 10 producing a frequency signal proportional to its r.p.m. The capstan motor 9 is controlled by a capstan motor control circuit 11 furnished with the signal from the frequency generator, and the magnetic tape 1 is driven via a pulley 12, a belt 13 and a capstan 14. The control signal head 5 reproduces the control signal which is then amplified by a control signal amplifying circuit 16 for coupling to a phase comparator circuit 17. Coupled to the other input of the phase comparator circuit 17 is a signal from a phase adjustment circuit 20, which adjusts and shifts the phase of a signal representing the rotational phase of the rotary heads 4 and 4' obtained through detection of a magnet piece 18 mounted on the head disc 6 by a stationary magnetic head 19. The phase comparator circuit 17 produces an error signal which is coupled to the capstan motor control circuit 11 to let the capstan motor control circuit 11 effect fine control of the capstan motor 9 being driven substantially in the neighborhood of a predetermined r.p.m. so as to control the tape driven such that the rotational phase of the rotary heads 4 and 4' and the phase of reproduction of the control signal 3 eventually meet a fixed phase relation provided by the phase adjustment circuit 20. As a result, the rotary heads 4 and 4' are caused to scan the signal tracks 2 of the record at fixed relative positions determined by the phase shifter circuit 20. Consequently, as the reproduced video signal obtained from the rotary heads 4 and 4' is taken out through a rotary transformer 21 and coupled through a head amplifier 22 to an envelope detector circuit 23, the envelope voltage therefrom is related to the phase of the phase adjustment circuit 20 in the manner shown in FIG. 4.

Figure 2:
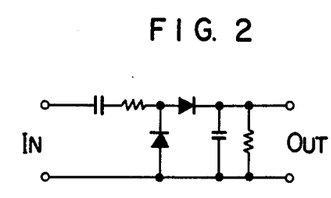
FIG. 2 is a circuit diagram showing an example of a peak hold circuit.
Figure 3:
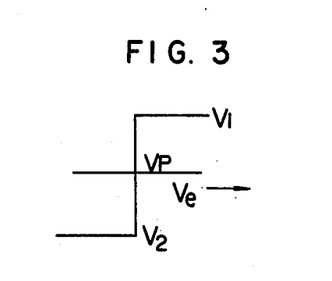
FIG. 3 is a diagram showing the characteristic of a comparator used in the embodiment.

The output of the head amplifier 22 is also coupled to a peak hold circuit 24. The peak hold circuit 24 serves to hold a peak value of the envelope for a comparatively long period, with decrease of its holding voltage due to discharging being allowed for, and it may use a well-known circuit as shown in FIG. 2, with the time constant for charging of the envelope detector circuit 23 set to be suitably long by taking sudden changes of the envelope voltage due to noise and the like into considerations while setting the time constant for discharging to be adequately long compared to the time constant for charging. The output of the peak hold circuit 24 and the output of the envelope detector circuit 23 are coupled to a comparator 25 which serves as a detecting circuit. The comparator 25 produces a positive voltage $V_1$ when $V_e \geq V_p$ with $V_e$ being the output voltage of the envelope detector circuit 23 and $V_p$ being the output voltage of the peak hold circuit 24 while producing a negative voltage $V_2$ when $V_e < V_p$, as shown in FIG. 3. In other words, when the output voltage $V_e$ of the envelope detector circuit 23, which has previously been low compared to the output voltage $V_p$ of the peak hold circuit 24, is increased with changing phase in the phase adjustment circuit 20 until it coincides with $V_p$, the output of the comparator 25 is changed from the negative voltage $V_2$ to the positive voltage $V_1$ which is impressed upon a D-type flip-flop 26 (hereinafter referred to as D-FF) to be described later.

Figure 4:
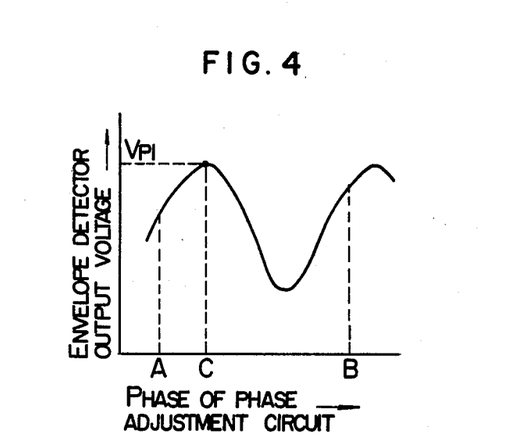
FIG. 4 is a graph showing the relation between the envelope detector output voltage and the phase of the phase adjustment circuit.

For changing the phase of the phase adjustment circuit 20, a ramp wave voltage is coupled from a ramp or triangular wave voltage generator 27 through an analog memory 28 to the phase adjustment circuit 20. The analog memory 28 is biased with a bias voltage $B_V$ applied to its power supply terminal 29, and an input voltage $V_{in}$ is coupled to its input terminal 30. When a control signal appearing at its control terminal 31 is "low", the same voltage as the input voltage $V_{in}$ is provided at its output terminal 32. When the control terminal 31 comes up with a "high" voltage, the value of input voltage $V_{in}$ at the instant of appearance of the "high" voltage is held and provided as another output voltage for a long period. That is, the output voltage at the instant of appearance of the "high" voltage at the control terminal 31 is memorized and held to prevail irrespective of subsequent variations of the input voltage $V_{in}$. Here, the output of the ramp voltage generator 27 is coupled to the input terminal 30 of the analog memory 28, and it is gated under the control of the output of the D-FF 26 coupled to the control terminal 31. While the output of the D-FF 26 is "low," the output voltage of the analog memory 28 varies in a ramp waveform in correspondence to the output of the ramp voltage generator 27; that is, the input voltage at the phase adjustment circuit 20 varies in the ramp waveform, causing the phase thereof to vary in the same cycle as the input ramp voltage from instant A to instant B as shown in FIG. 4. Also, when the output of the D-FF 26 becomes "high" the control terminal 31 is driven to a "high" voltage, so that the output voltage of the ramp or triangular wave generator 27 at the instant of appearance of the "high" voltage at the control terminal 31 is held by the analog memory 28 as its output voltage, thus holding the phase corresponding to that voltage.

The function of the D-FF 26 will now be discussed. In the D-FF 26 the input information is read-in at the positive edge of a clock pulse, and its truth value table is as follows.

| $t_n$ | | $t_{n+1}$ | |
|---|---|---|---|
| D | | Q | |
| Low | | Low | |
| High | | High | |

When its D input is "high", upon appearance of a "high" clock pulse at its ck input, its output becomes "high," and this "high" output continues to prevail so long as the D input is "high". When its D input becomes "low," its output becomes "low" under the control of a clock pulse coupled to its ck input. In the instant embodiment, the output $C_1$ of the aforementioned comparator 25 constitutes the clock pulse input at the ck input terminal, while an output $b_1$ from a second delay circuit 33 is supplied to the D input terminal. The output $a_1$ of a first delay circuit 34 is to make the second delay circuit 33 provide a "low" output for a further period $t_3$ after a period $t_2$ which corresponds to the pull-in period of the servo-system from the commencement of the playback operation and during which the output $a_1$ of the first delay circuit 34 is "low" and after which it becomes "high" until stoppage of the playback operation, said period $t_3$ being selected to be long enough to enable the peak hold circuit 24 to hold the peak value $V_{P1}$ of the envelope. This can be readily realized by arranging the system to detect the voltage at the commencement of the play back operation and also using a delay line comprising, for instance, a Schmitt circuit.

Figure 5:
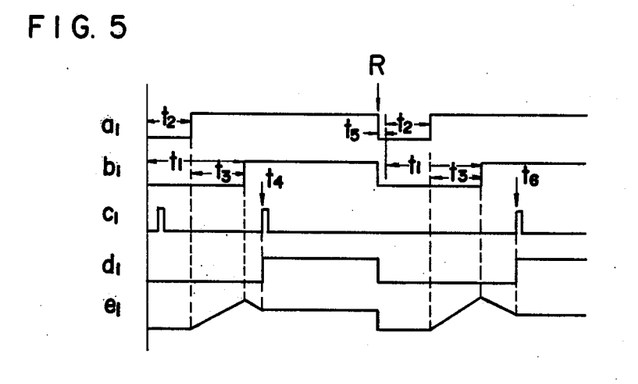
FIG. 5 is a waveform chart illustrating the operation of some parts of the embodiment of FIG. 1.

The sequence of events that are involved in the above construction until the phase of the phase adjustment circuit 20 is locked at point C in FIG. 4, representing a phase corresponding to a peak of the envelope, will now be discussed in detail with reference to the waveform chart of FIG. 5.

During a period $t_1$ from the commencement of the playback operation, during which the output $b_1$ of the second delay circuit 33 is "low," the output of the D-FF 26 is "low," so that the input at the control terminal 31 of the analog memory 28 is "low." In this state, the output voltage of the ramp voltage generator 27 continues to be supplied to the phase adjustment circuit 20, and even after the servo-system pull-in period $t_2$ the phase of the circuit 20 is changed between points A and B in FIG. 4 during period $t_3$. By so arranging that a peak value of the envelope is encountered as the phase is varied between the points A and B, the peak hold circuit 24 eventually comes up to hold the peak value $V_{P1}$ of the envelope. At a subsequent instant $t_4$ at which the output $c_1$ of the comparator 25 changes from negative voltage $V_2$ to positive voltage $V_1$ for the first time after the period $t_1$, the output $d_1$ of the D-FF 26 is inverted to "high", and from this instant on it is held "high" by a latch mechanism of the flip-flop and continuously appears as $a_1$ "high" input at the control terminal 31 of the analog memory 28. In this way, the output voltage of the ramp voltage generator 27 at the instant of appearance of the "high" voltage is held to prevail. As mentioned earlier, the voltage of the comparator 25 changes from negative voltage $V_2$ to positive voltage $V_1$ when $V_e \geq V_p$. Since $V_p$ is now the peak value $V_{P1}$, the instant at which the input to the control terminal 31 of the analog memory 28 becomes "high" corresponds to the instant at which $V_e$ and $V_{P1}$ coincide with each other. Thus, the phase of the circuit 20 is locked at point C (FIG. 4) corresponding to the peak value $V_{P1}$ of the envelope detector output, thus permitting the rotary heads 4 and 4' to trace the signal tracks 2 with fidelity.

The period $t_1$ mentioned above is the sum of the servo-system pull-in period $t_2$ and the period $t_3$. If the peak hold circuit 24 is able to begin to hold the peak value $V_{P1}$ of the envelope by the end of the servo-system pull-in period $t_2$, $t_1$ can be reduced to be equal to $t_2$. Otherwise, the D-FF input $b_1$ is made continually "low" for a predetermined period $t_3$ after the servo-system pull-in period $t_2$. By so doing, the output voltage of the ramp voltage generator 27 can be continually supplied for the subsequent period $t_3$, during which the phase shift is continued to permit the peak hold circuit 24 to lay hold of the peak value $V_{P1}$ of the envelope.

The periods $t_2$ and $t_3$ may be adjusted by the first and second delay circuits 34 and 33 respectively.

During the period $t_1$ from the commencement of playback, the output $d_1$ of the D-FF 26, and hence the input to the control terminal 31 of the analog memory 28, remains "low," permitting the ramp voltage output of the ramp voltage generator 27 to be supplied to the phase adjustment circuit 20. Therefore, during the servo-system pull-in period $t_2$ when starting the playback, the output voltage of the ramp voltage generator 27 acts as an external disturbance. This means that the pull-in period $t_2$ for the servo-system is liable to be extended to extend the predetermined period $t_4$ required for obtaining correct and accurate tracking.

To avoid this, the ramp voltage generator 27 may be arranged such that it starts its oscillation after the servo-system pull-in period $t_2$ under the control of the output of the delay circuit 34. With this arrangement, during the pull-in period $t_2$ of the servo-system the output of the analog memory 28 remains the same as a predetermined voltage and does not act as an external disturbance since it is coupled to the phase adjustment circuit 20, whereby it is possible to ensure that a predetermined or usual pull-in period is provided as the servo-system pull-in period $t_2$. In addition, since in this case the oscillation is started after $t_2$, the instant of appearance of the ramp voltage at the analog memory 28 after $t_2$ is made continuous or immediately follows, thus conveniently eliminating the possibility of disturbance of the servo-system after $t_2$.

While the instant embodiment makes use of the ramp wave voltage generator 27 and analog memory 28 as means for periodically varying the phase of the phase adjustment circuit 20, it is possible to use any other suitable means than the ramp voltage generator 27 provided it is capable of periodically varying the phase of the analog memory 28, and the voltage coupled thereto need not always be a ramp voltage but may be a sinusoidal or saw-tooth wave voltage as well.

The phase of the phase adjustment circuit 20 may be locked at point C until the playback operation is stopped in the case of self recording and playback where signals recorded are reproduced by the same system. However, in the case where signals recorded by different video tape recorders are joined together, the phase of the phase adjustment circuit 20 must be shifted during playback from the point C corresponding to the peak of the envelope of a signal recorded by one video tape recorder to another point corresponding to the peak of the envelope of the next signal recorded by another video tape recorder.

When the envelope of the next signal is large or small as compared to the envelope of the proceding signal that has been reproduced with the D-FF 26 locked at the "high" level, a resetting means 35 is operated. The resetting means 35 is operated for a predetermined period $t_5$, whereby the output $a_1$ of the first delay circuit 34 is made "low" for a predetermined period $t_5 + t_2$. At the same time, a "low" signal is provided by that means to a clear terminal CL of the D-FF 26 for the predetermined period $t_5$, thus rendering the output $d_1$ of the D-FF 26 "low." Further, during the period $t_5$ the peak hold circuit 24 is discharged. Thus, by operating the resetting means 35 at an instant shown at R in FIG. 5, the output $b_1$ of the second delay circuit 33 is changed from "high" to "low" and is held "low" for the aforementioned period $t_5 + t_1$. After the lapse of the period $t_1$, it again becomes "high." At the instant R at which the "low" input is made to appear at the clear terminal CL of the D-FF 26, the output $d_1$ thereof is inverted to the "low" level, and at a subsequent instant at which the output $a_1$ of the first delay circuit 34 becomes "high" again the oscillation of the ramp voltage generator 27 is started, causing the output $e_1$ of the analog memory 28 to vary in the ramp wave fashion for a subsequent period $t_3$, during which the phase is varied within the phase shift range until the peak hold circuit 24 eventually lays hold of the peak value of the next signal. After the period $t_3$ the outputs of the envelope detector circuit 23 and peak hold circuit 24 come into coincidence with each other at instant $t_6$, whereupon the output $c_1$ of the comparator 25 becomes "high," causing the output $d_1$ of the D-FF 26 to become "high" again and thereafter continue to be "high" until the playback operation is stopped again or the resetting means 35 is operated once again. In this way, the output voltage $e_1$ of the ramp wave generator 27 at the instant $t_6$ is continually supplied to the phase adjustment circuit 20 to hold the voltage corresponding to a phase for the peak of the envelope of the new signal.

The analog memory 28 which has been employed in the preceding embodiment as means for holding a phase for the peak of the envelope, may also be of any other suitable construction as well so long as such construction can hold a voltage, which is applied to the phase adjustment circuit 20 and corresponds to a phase for the peak of the envelope. For example, it is possible to use a counter of a construction comprising flip-flops, and which is adapted to stop its counting operation at the peak of the envelope. In this case, the content of the counter at that instant can be memorized by a latch function of the flip-flop, and the output of the counter may be converted through a digital-to-analog converter for coupling the output thereof to the phase adjustment circuit 20. Such an arrangement will now be described in detail with reference to FIGS. 6 and 7.

While this embodiment again concerns the capstan servo-system for controlling the capstan by the output of the phase comparator 17, modification for application to the so-called head servo-system for controlling the rotational phase of the rotary heads 4 and 4' by the output of the phase comparator 17 is possible, and this is applied to the following embodiments as well.

Figure 6:
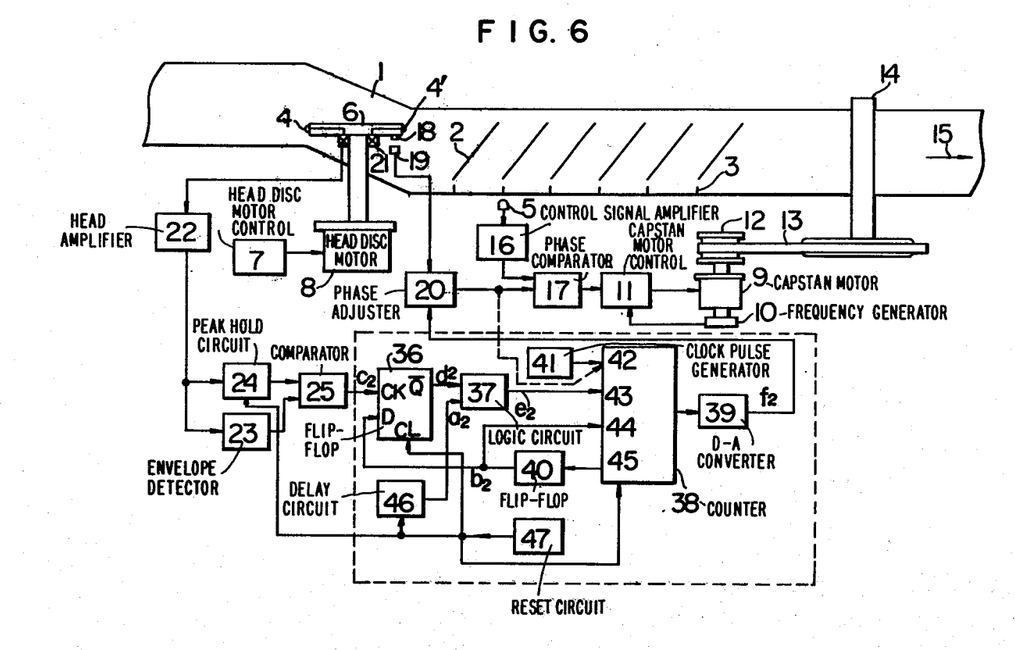
FIG. 6 shows a block diagram of a second embodiment of the invention.

In FIG. 6, the same component parts as those in FIG. 1 are designated by the same reference numerals, and they are not described here in detail for the sake of brevity of description.

A D-FF 36 operates in the same manner as the aforementioned D-FF 26, with output $c_2$ (FIG. 7) of comparator 25 mentioned above coupled to its ck input and output $b_2$ of a flip-flop 40 to be described later coupled to its D input.

The output $d_2$ of the D-FF 36 is coupled to a logic circuit 37, which also receives an output $a_2$ of a delay circuit 46, the output $a_2$ being "low" during a pull-in period $T_1$ of the servo-system from the commencement of playback operation and being thereafter "high," and the output of which is coupled to a terminal 43 of a counter 38.

The counter 38 is a so-called up-down counter, with its input terminal 44 serving to determine the up-counting or down-counting mode. With a "low" input coupled to this terminal, operation in the up-counting mode takes place, whereas a "high" input to this terminal dictates operation in down-counting mode. A terminal 42 is a clock pulse input terminal, and the counter 38 counts clock pulses produced from a clock pulse generator 41 either in the up-counting or down-counting mode. A terminal 43 serves to determine whether or not the counting operation is stopped. When a "high" input voltage appears at this terminal, the counting operation is stopped, while with "low" input voltage the counting operation is carried on. A further terminal 45 serves to deliver a single pulse when all the outputs of the counter 38 becomes "high" or "low," and with this pulse signal the flip-flop 40 is inverted. The output $b_2$ of the flip-flop 40 is coupled to the terminal 44 for determining the counting mode and also to the D input of the D-FF 36.

By arranging the circuit such that closure of the power source circuit resets the flip-flop 40 "low" and also renders the output of the counter 38 zero, the counter 38 is caused to start counting from that instant in the up-counting mode from zero, and as soon as it has counted the maximum number the flip-flop 40 is inverted from "low" to "high," causing the counter 38 to start operation in the down-counting mode.

The individual bit outputs of the counter 38 are coupled to a digital-to-analog converter (hereinafter referred to as DAC) 39 for conversion into a corresponding analog output $f_2$, which is coupled to phase adjustment circuit 20 for phase shifting therein.

Figure 7:
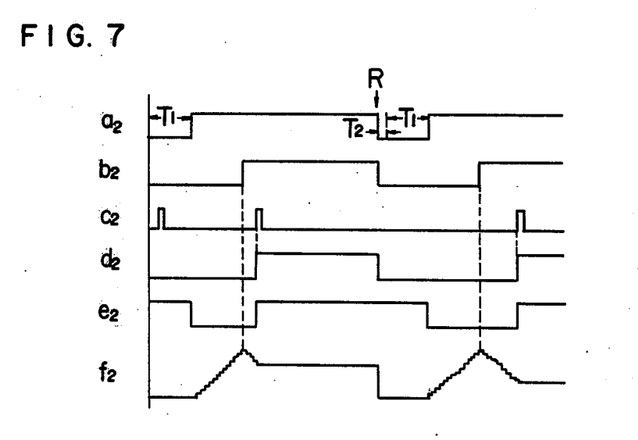
FIG. 7 is a waveform chart illustrating the operation of some parts of the second embodiment.

The sequence of events that are involved in the above construction until the phase of the phase adjustment circuit 20 is eventually locked at the phase point C in FIG. 4 corresponding to a peak of the envelope will now be discussed in detail with reference to the waveform chart of FIG. 7.

During servo-system pull-in period $T_1$ from the commencement of playback operation, a "high" voltage is coupled from the logic circuit 37 to the terminal 43 of the counter 38. Thus, during this period the counter 38 is inoperative and provides an output of a predetermined value (for instance zero). In this state, the output $f_2$ of the DAC 39 has a fixed value; that is, the voltage applied to the phase adjustment circuit 20 is fixed so that it does not act as an external disturbance upon the rising of the servo-system. After the period $T_1$ the output $e_2$ of the logic circuit 37 becomes "low," causing the counter 38 to start the counting operation; that is, counting clock pulses coupled to the input terminal 42 in the up-counting mode from 0 to the maximum number of, for instance, 255.

If it is so arranged that when the output voltage of the counter 38 coupled to the phase adjustment circuit 20 is zero the phase thereof is at one end A of the variable range shown in FIG. 4, the phase of the circuit 20 is shifted with the start of the counting operation from point A toward the other end B of the variable range. During this course, the peak hold circuit 24 is charged to the peak value $V_{P1}$ of the envelope at phase C, and from this instant on the value $V_{P1}$ is held due to the afore-mentioned time constant of the peak hold circuit 24. Meanwhile, the output $V_e$ of the envelope detector circuit 23 turns to decrease after the phase C is passed due to the afore-mentioned time constant. Subsequently, as soon as the content of the counter 38 is increased to the maximum value of 255 (at which instant the phase reaches point B), a pulse is produced at the terminal 45 to cause inversion of the flip-flop 40 to "high," causing the counter 38 to turn to count in the down-counting mode. At the same time, the D input to the D-FF 36 is rendered "high," opening the gate for receiving the output of the coincidence circuit 25. From this instant the phase is caused to change from point B toward point A, and the output $V_e$ of the envelope detector circuit 23 which has previously been reducing turns to increase again. Upon subsequent reaching of the phase point C of the voltage $V_e$ coincides with the output $V_P$ being held by the peak hold circuit 24 (i.e., the peak value $V_{P1}$ of the envelope), thus causing the output $c_2$ of the coincidence circuit 25 to change from the negative voltage $V_2$ to the positive voltage $V_1$. At this moment, the output $d_2$ of the D-FF 36 is inverted from "low" to "high," and thereafter it is held "high." That is, it continues thereafter to be coupled through the logic circuit 37 to the terminal 43 of the counter 38 to render the counter inoperative until the playback operation is stopped. The DAC 39 thus continues to supply as its output $f_2$ the voltage at the afore-mentioned instant to the phase adjustment circuit 20 to hold the phase thereof locked at point C corresponding to the peak of the envelope.

The clock pulse generator 41 used in the instant embodiment for producing clock pulses coupled to the counter 38 may be dispensed with to simplify the construction by using the vertical sync. signal, horizontal sync. signal or control signal derived from the reproduced signal. In addition, the use of such signal in lieu of the output of the clock pulse generator 41 makes it possible to detect whether the reproduced signal is present or not.

Where no detection as to whether the reproduced signal is present or not is made as in the preceding embodiment, after the lapse of period $T_1$ from the commencement of playback operation the counter 38 starts the counting operation even in the case when no signal is reproduced from the tape. Even in this case, the phase of the circuit 20 is again shifted from A to B, eventually rendering the flip-flop 40 to "high" to render the D input to the D-FF 36 "high" so as to open the gate for receiving the output of the coincidence circuit 25, and thereafter the phase is shifted in the opposite direction from B toward A. When the reproduced signal appears after reversal of the direction of the phase shift, the coincidence circuit 25 immediately produces an output since the peak hold circuit 24 has been holding a low voltage in the absence of the reproduced signal during the phase shift from A to B. Therefore, the phase which does not correspond to the peak at this instant is likely to be locked. When the reproduced signal appears during the initial phase shift from A to B, it is again likely that the peak hold circuit 24 cannot hold the peak of the envelope, thus disabling the locking of the phase corresponding to the peak.

Where the vertical sync. signal, horizontal sync. signal or control signal derived from the reproduced signal is used for the clock pulses, in the absence of the reproduced signal no clock pulse is coupled to the terminal 42 of the counter 38 even if the counter is ready to start counting after completion of pull-in of the servo-system. In this state the phase shift does not take place at all, and it is begun only with appearance of the reproduced signal. Thus, it is possible to reliably lock the phase C corresponding to the peak without malfunctioning.

In the case of using vertical or horizontal sync. signal for the detection of presence or absence of the reproduced signal, as a tape portion without any video signal recorded thereon is scanned by the rotary heads after pull-in of the servo-system it is likely that the counter 38 will not count because of the absence of the reproduced signal. This inconvenience can be avoided when using the control signal.

Like the previous embodiment using analog the memory 28, the instant embodiment includes a resetting means 47, which is operated when the envelope is increased or reduced from that of the signal previously being reproduced. The resetting means 47 is operated for a predetermined period $T_2$, whereby the output of the delay circuit 46 is made "low" for a predetermined period $T_2 + T_1$. At the same time, a "low" signal is provided to clear terminal CL of the D-FF 36 for the period $T_2$, and this renders the output of the D-FF 36 "low," while resetting the flip-flop 40 to "low" to preset the counter 38 such that it provides zero output, and also the peak hold circuit 24 is discharged. As a result, after the period $T_2 + T_1$ the phase is shifted from A toward B so that the peak hold circuit 24 comes to lay hold of the peak of the new signal, and after reversal of phase shift in the direction from B toward A a phase corresponding to the peak of the new signal is locked by the output of the coincidence circuit 25.

With the above construction, the phase of the circuit 20 is made to reciprocate over its full variable range. Therefore, the time required until locking of the phase is somewhat long, and also during this time the signal-to-noise ratio of the reproduced picture is inferior. The time required until locking of the phase may be curtailed by arranging the system such that the direction of phase shift is reversed when the output of the envelope detector circuit is reduced after the peak point to an extent that the difference between the peak value and the output exceeds a predetermined threshold value.

Figure 8:
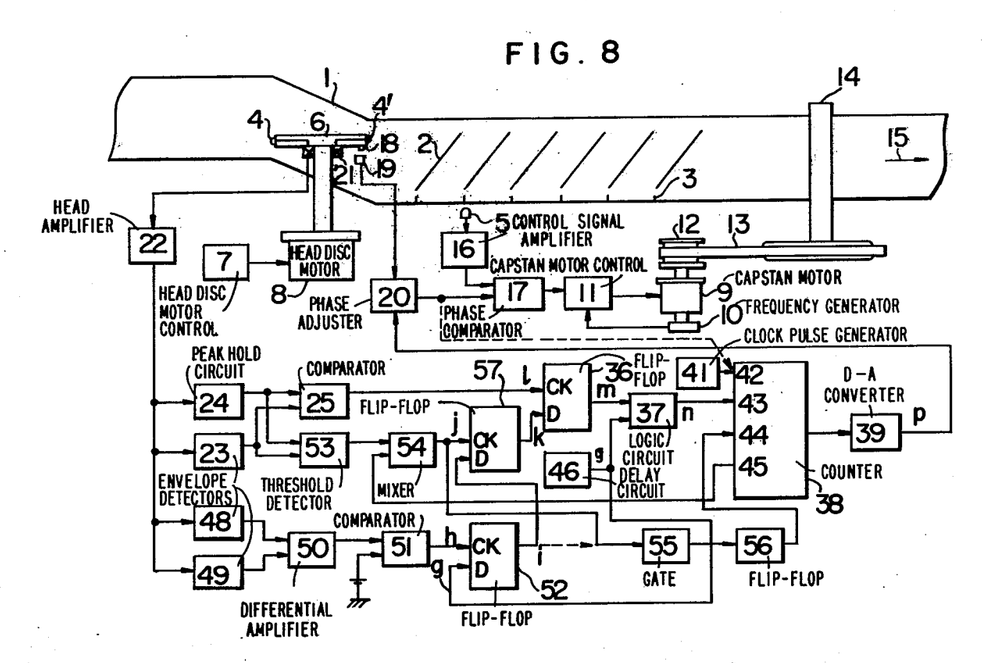
FIG. 8 shows in block diagram of a third embodiment of the invention.

Such an arrangement will now be described with reference to FIGS. 8 to 12. In FIG. 8 the same component parts as those in FIG. 6 are designated by the same reference numerals, and they are not described any further.

Figure 9:
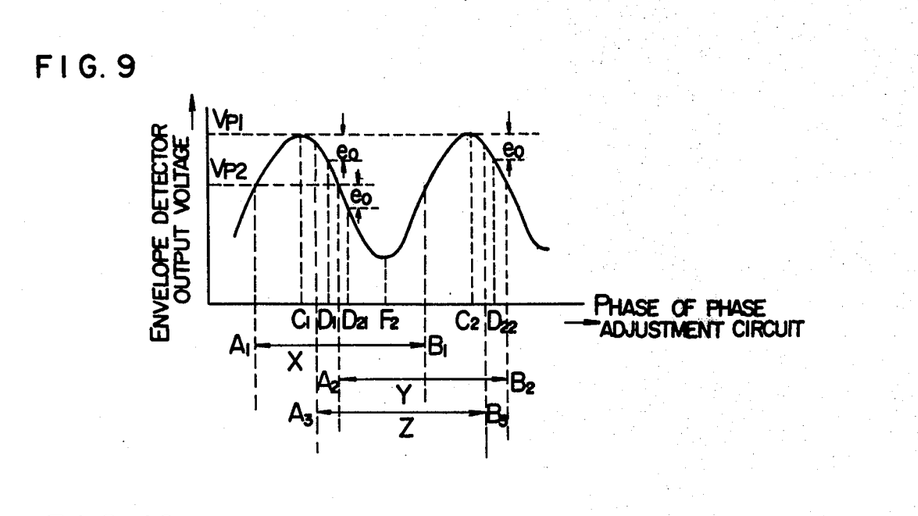
FIG. 9 is a graph showing the relation between the envelope voltage and phase of a phase adjustment circuit used in the third embodiment.
Figure 10:
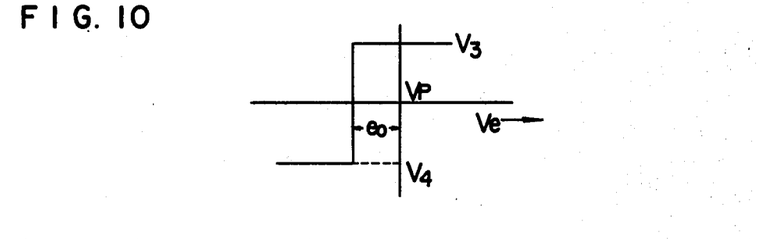
FIG. 10 is a diagram showing the characteristic of a threshold detector circuit.

As shown in FIG. 9, which shows the relation between the envelope voltage and the phase of the phase adjustment circuit 20, as the phase is varied from A the envelope voltage may either be first increased as in case X or be first reduced as in case Y or Z. In the former case, the envelope voltage turns to decrease after it reaches the peak point $C_1$. In this case, the direction of phase shift is reversed during the period of this decrease of envelope. Then, the phase shift is stopped at the point of coincidence of $V_e$ and $V_p$ as mentioned above, whereby the time required until the envelope voltage reaches the peak again can be reduced. In the latter case, the envelope voltage that initially decreases eventually turns to increase and then reaches the peak point $C_2$. In this case, the direction of phase shift is reversed during the subsequent peak of decrease of the envelope, and the phase shift is stopped at the instant of coincidence of $V_e$ and $V_p$. To achieve this, the output of head amplifier 22 is also coupled to further envelope detector circuits 48 and 49 respectively having different time constants for charging and discharging, and the difference between the outputs of these two detector circuits is amplified by a differential amplifier 50 and then coupled to a comparator 51 for comparison with a predetermined voltage.

If the phase of the phase adjustment circuit 20 is varied in the direction from A toward B in FIG. 9 by the output $p$ of the afore-mentioned DAC 39, in case of phase shift range X where the envelope first increases the output of the differential amplifier 50 is positive so that the output of the comparator 51 is "high." In case of phase shift range Y or Z where the envelope first decreases the output of the differential amplifier 50 is negative so that the output $h$ of the comparator 51 is "low." The output $h$ of the comparator 51 is coupled to the ck input of a D-FF 52 having similar characteristics to D-FF 36.

Meanwhile, the output of delay circuit 46, which becomes "high" after the lapse of period $T_1$ from the commencement of playback operation, is coupled to D input of the D-FF 52, so that the output $i$ of the D-FF 52 is inverted to "high" only when the envelope is increased with phase shift after the lapse of period $T_1$ from the commencement of the playback operation.

Figure 11:
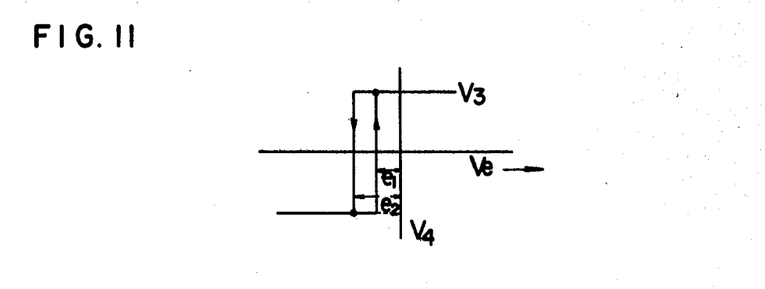
FIG. 11 is a diagram showing the characteristic of a hysteresis comparator.
Figure 12:
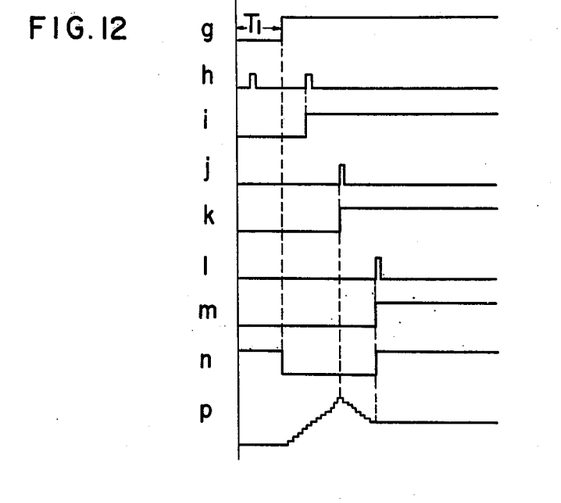
FIG. 12 is a waveform chart illustrating the operation of some parts of the third embodiment.

Further, the outputs of envelope detector circuit 23 and peak hold circuit 24 mentioned earlier are also coupled to a threshold detector circuit 53 comprising a comparator. The threshold detector circuit 53 provides a positive voltage $V_3$ when $V_e > V_p - e_0$ where $V_e$ is the output voltage of the envelope detector circuit 23 and $V_p$ is the output voltage of the peak hold circuit 24 and provides a negative voltage $V_4$ when $V_e \leq V_p - e_0$. In other words, it is a circuit for determining whether the voltage difference between $v_p$ and $v_e$ is smaller than the threshold voltage $e_0$ ($V_p - V_e < e_0$) or greater ($V_p - V_e \geq e_0$), and it produces as its output the positive voltage $V_3$ in the former case and the negative voltage $V_4$ in the latter case; that is, it determines whether or not the threshold voltage is reached by the difference between $V_p$ and $V_e$. Regarding the characteristics of the threshold detector circuit 53, if there are fluctuations of the envelope voltage of the reproduced signal, envelope voltage difference between the rotary heads 4 and 4' due to the difference in the characteristics between them, a sudden change of envelope voltage due to noise or other causes and other variations while a track of the record 2 is scanned by the rotary heads 4 and 4', the output voltage of the comparator is likely to be unsteady and be subject to fluctuations in the neighborhood of the threshold voltage input to cause inversion of the comparator, giving rise to adverse effects upon the control system. To avoid this, it is desirable to provide a hysteresis characteristic as shown in FIG. 11. In the characteristic of FIG. 11, when $V_2$ is increased from a value providing a large difference between $V_p$ and $V_e$ until the difference becomes less than $e_1$, the comparator output is inverted to positive voltage $V_3$, but for inversion to negative voltage $V_4$ again $V_e$ has to be reduced to an extent that the difference between $V_p$ and $V_e$ exceeds $e_2$. Thus, it is possible to obtain steady and stable comparator output characteristic free from unsteady variations with respect to envelope voltage ripples and noise less than ($e_2 - e_1$). When such a hysteresis comparator is used, voltage $e_2$ corresponds to the threshold voltage $e_0$ in case of FIG. 10. Further, since the outputs of the peak hold circuit 24 and envelope detector circuit 23 are each coupled to both threshold detector circuit 53 and coincidence detection circuit 25, the circuit construction is simplified.

The output of the threshold detector circuit 53 is coupled together with the output from the terminal 45 of the counter 38 to a mixer circuit 54. The mixer circuit 54 produces a positive pulse upon appearance of an output from the threshold detector circuit 53; that is, when the envelope becomes lower than the predetermined threshold value with phase change, and also when the counting mode of the counter is switched upon saturation thereof. This positive pulse is coupled through a gate circuit 55 to a clock input terminal of the flip-flop 56 to render "high" the output of the flip-flop 56 which has been reset after closure of the power source circuit. The output of the flip-flop 56 is impressed upon the input terminal 44 of the counter 38 to determine up- or down-counting mode of the counter 38. The function of the gate circuit 55 will be described hereinafter.

The output j of the mixer circuit 54 is also coupled to the ck input terminal of a D-FF 57 having similar characteristics to the D-FF 36. The D-FF 57 also receives the afore-mentioned output i of the D-FF 52 coupled to its D input terminal, and it produces an output k, which becomes "high" only when the mixer circuit 54 produces an output after the envelope turns to increase with change of phase of the phase adjustment circuit 20. The output k is coupled to the D input terminal of the D-FF 36, which also receives the output of the coincidence detection circuit 25 at its kc input terminal. Thus, the D-FF 36 produces an output m, which becomes "high" only when the coincidence detection circuit 25 produces an output after reversal of the direction of shift of the phase of the phase adjustment circuit 20, having previously reached the point corresponding to the peak of the envelope and then changing toward a decreasing envelope, back to the direction toward the peak point again. Logic circuit 37 takes OR from the output m and the output g of the delay circuit 46 and produces an output n, which is "high" during the servo-system pull-in period $T_1$ and also during the "high" period of the output m of the D-FF 36 and is otherwise "low," and which is coupled to the input terminal 43 of the counter 38. The counter 38 is thus rendered inoperative while the output of the logic circuit 37 is "high" and rendered operative for the counting operation while the output is "low."

The individual bit outputs of the counter 38 are coupled to DAC 39 for conversion into a corresponding analog output p coupled to the phase adjustment circuit 20.

The sequence of events that are involved in the above construction until the phase of the phase adjustment circuit 20 is eventually locked at the phase point $C_1$ or $C_2$ in FIG. 9 corresponding to the peak of the envelope will now be discussed in detail.

During servo-system pull-in period $T_1$ from the commencement of playback operation, a "high" voltage is coupled from the output n of the logic circuit 37 to the terminal 43 of the counter 38, so that the counter 38 is inoperative and provides a predetermined value (for instance zero). After the lapse of the period $T_1$ the output n of the logic circuit 37 becomes "low" (see FIG. 12), causing the counter 38 to start the counting operation; that is, counting clock pulses coupled to the input terminal 42 in the up-counting mode from 0 to the maximum number of 255.

If the phase at the instant of start of counting is as in case X in FIG. 9, the envelope increases from that instant so that the output h of the comparator 51 is "high." Thus, the output i of the D-FF 52 becomes "high" immediately after the period $T_1$. As the phase is shifted in the direction from $A_1$ toward $B_1$ the peak hold circuit 24 is charged up to the peak value $V_{p1}$ of the envelope at phase $C_1$, and it subsequently holds $V_{p1}$ due to the time constant set for it. Meanwhile, the output $V_e$ of the envelope detector circuit 23 decreases after reaching of phase $C_1$ due to the afore-mentioned time constant. At a subsequent instant when the difference between $V_{p1}$ and $V_e$ reaches the predetermined threshold value $e_0$ (instant corresponding to phase $D_1$ in FIG. 9), the output of the threshold detector circuit 53 becomes "high," causing the mixer circuit 54 to produce a high pulse coupled through the gate circuit 55, which passes the output j of the mixer circuit 54 only when the output i of the D-FF 52 is "high," to the flip-flop 56 (as indicated by a dotted line in FIG. 8). With the appearance of the output pulse j from the mixer circuit 54 the flip-flop 56 is inverted to a "high" level, causing the counter 38 to begin its down-counting mode operation. As a result, the phase of the phase adjustment circuit 20 turns to be shifted in the direction from $D_1$ toward $A_1$, so that the output $V_e$ of the envelope detector circuit 23, having previously been decreasing, turns to increase gradually to eventually coincide with the output $V_p$ of the peak hold circuit 24 (which is at this time the peak value $V_{p1}$ of the envelope), causing the output of the coincidence detection circuit 25 to change from negative voltage $V_2$ to positive voltage $V_1$.

Since the D input k to the D-FF 36 has been "high" from the instant of appearance of the output pulse of the mixer circuit 54, the output m of the D-FF 36 becomes "high" at the instant when the output of the coincidence detection circuit 25 changes to positive voltage $V_1$, and from this instant on the "high" voltage continues to be supplied through the logic circuit 37 to the terminal 43 of the counter 38 until the playback operation is stopped. Thus, the counter 38 is rendered inoperative at this time, and the DAC 39 continues to supply as its output the voltage at that instant to the phase adjustment circuit 20 until the playback operation is stopped. In this way, the phase corresponding to the peak of the envelope is locked.

If the phase at the instant of start of counting is as in case Y in FIG. 9, the envelope decreases from that instant so that the output of the comparator 51 remains "low" though the phase starts to be shifted from $A_2$. Thus, the output i of the D-FF 52 is also "low." Meanwhile, the output $V_p$ of the peak hold voltage 24 is held at $V_{p2}$ corresponding to the phase $A_2$ while the output $V_e$ of the envelope detector circuit 23 is reduced as the phase is shifted in the direction from $A_2$ toward $B_2$, and at an instant when the difference between $V_{p1}$ and $V_e$ reaches the predetermined threshold value $e_0$ (instant corresponding to phase $D_{21}$ in FIG. 9) the output of the threshold detector circuit 53 becomes "high." However, since the output i of the D-FF 52 is "low," this output pulse is not passed through the gate circuit 55 to the flip-flop 56. Thus, the flip-flop 56 is not inverted but continues to provide a "low" output. Consequently, the counter 38 continues counting in the up-counting mode, continually causing phase shift in the direction toward $C_2$. As the envelope subsequently turns to increase after passing the instant $F_2$ corresponding to the minimum value, an output difference is produced between the envelope detector circuits 48 and 49 (the difference being produced by appropriately setting the time constants for charging and discharging of these two circuits as mentioned earlier) to render the output of the comparator 51 "high," whereupon the output i of the D-FF 52 becomes "high." With further phase shift from $F_2$ to $D_{22}$ the peak hold circuit 24 is charged up to the peak value $V_{p1}$ of the envelope at the instant of phase $C_2$, and with subsequent phase shift from $C_2$ toward $D_{22}$ the difference between $V_{p1}$ and $V_e$ reaches the threshold value $e_0$ at the instant of phase $D_{22}$. At this instant the gate circuit 55 passes this time the output pulse j since the output i of the D-FF 52 has been made "high", thus causing inversion of the flip-flop 56 from "low" to "high" to cause the counter 38 to turn to count in the downmode. As a result, the phase of the phase adjustment circuit 20 turns to be shifted in the direction from $D_{22}$ toward $A_2$, whereby the output $V_e$ of the envelope detector circuit 23, having previously been decreasing, turns to increase gradually so as to eventually lock the phase of the phase adjustment circuit 20 to $C_2$ in the manner described above.

If the phase at the instant of start of counting is as in case Z where one end $B_3$ of the phase shift range is close to phase $C_2$ corresponding to the peak value of the envelope, although the individual elements operate in the same manner as mentioned so long as the envelope decreases first, then reaches the minimum at phase $F_2$ and increases up to the peak at phase $C_2$, even upon reaching of the phase $B_3$ after passing phase $C_2$ the difference between the output $V_p$ of the peak hold circuit 24 (which is the peak value $V_{p1}$ of the envelope at this time) and the output of the envelope detector circuit 23 is not increased beyond $e_0$. Consequently, the output of the threshold detector circuit 53 is not inverted to the positive potential, and the flip-flop 56 is not inverted. Thus, the counter 38 continues counting in the up-counting mode. Therefore, the counter 38 will be reset to zero after it counts the maximum count number, for instance 225, and in such case it is impossible to lock the phase $C_2$ corresponding to the peak. Accordingly, the output from the terminal 45 of the counter is coupled together with the output of the threshold detector circuit 53 to the mixer circuit 54 so as to cause inversion of the flip-flop 56 from "low" to "high" for switching the operation of the counter 38 to the down-counting mode before the counter 38 is reset to zero by detection of the maximum count number of 225. In this way, the direction of phase shift is reversed so that it is shifted in the direction from $B_3$, which is one end of the phase shift range, toward $C_2$, thus permitting the locking of the phase $C_2$ corresponding to the peak of the envelope.

With the construction of FIG. 8, the phase of the circuit 20 is not reciprocated over its full variable range but the direction of phase shift is reversed somewhile after reaching the phase corresponding to the envelope peak by the output of the threshold detector circuit, so that it is possible to reduce time required until the phase corresponding to the peak value is locked.

In the previous embodiments, the phase of the circuit 20 is shifted every time the playback operation of the video tape recorder is started, presenting the problem that the time required for locking the phase is longer than the pull-in period of the servo-system. Where the signal to be reproduced is recorded by the same video tape recorder, the phase corresponding to the peak value of the envelope may be detected only once and the phase detected may be directly used when starting subsequent playback operation.

Figure 13:
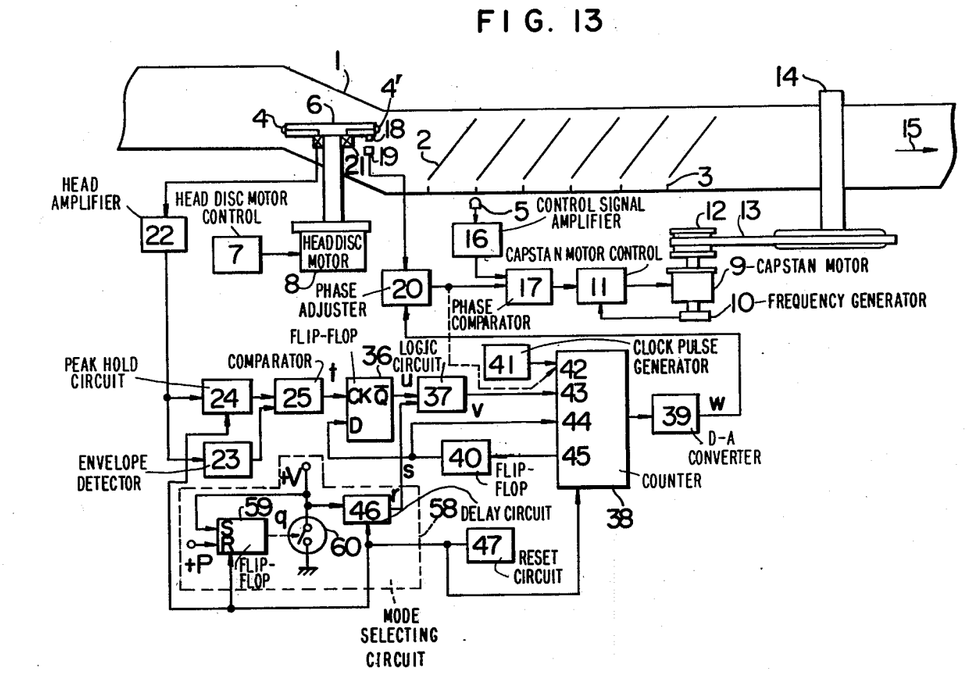
FIG. 13 shows in block diagram of a fourth embodiment of the invention.

FIG. 13 shows a further embodiment, which is provided with a mode selecting circuit 58 for determining whether playback operation of the video tape recorder is started for the first time after closure of the power source circuit or is started after a previous playback operation has been stopped, whereby the phase of the afore-mentioned phase adjustment circuit 20 is shifted only in the former case and is not shifted in the latter case. This is achieved by controlling the voltage supplied to the delay circuit 46. In FIG. 13, the same component parts as those in FIG. 6 are designated by the same reference numerals, and they are not described any further.

Figure 14:
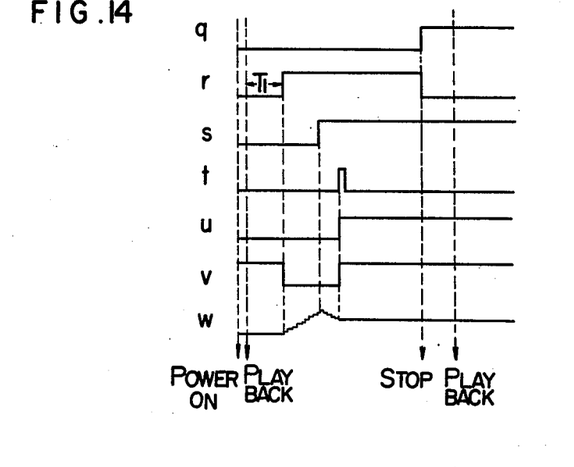
FIG. 14 is a waveform chart illustrating the operation of some parts of the fourth embodiment.

The operation of the mode selecting circuit 58 will first be described. A flip-flop (hereinafter referred to as FF) 59 is reset to "low" by closure of the power source circuit (for instance, by a supply voltage $+P$ applied upon closure of the power source circuit), and it is reset to "high" upon stopping of the playback operation of the video tape recorder (for instance, upon disappearance of a voltage that appears at the time of start of the playback operation). It is also reset when the afore-mentioned resetting means 47 is operated. A gate circuit 60 controls whether or not a voltage $(+V)$ that prevails during playback operation is supplied to delay circuit 46 in accordance with the output $q$ (FIG. 14) of the FF 59. It passes the voltage prevailing during playback operation of the delay circuit 46 when the output $q$ of the FF 59 is "low," but it blocks this voltage when the output $q$ is "high." Thus, this voltage is supplied to the delay circuit 46 only at the time of starting playback operation for the first time after closure of the power source circuit, and once the video tape recorder is stopped the FF 59 memorises the stopping so that the voltage is no longer supplied when subsequently starting playback operation again. Consequently, the output of the aforementioned delay circuit becomes "high" a delay period $T_1$ after the commencement of playback operation and becomes "low" upon stopping of the video tape recorder, as shown at $r$ in FIG. 14.

When the playback operation is started for the first time after closure of the power source circuit, the sequence of events that takes place subsequently is similar to that described earlier in connection with the previous embodiment of FIG. 6. That is, after the period $T_1$ the output $v$ of logic circuit 37 becomes "low," causing counter 38 to start counting to shift phase of phase adjustment circuit 20 according to the output $w$ of DAC 39, and with the output $t$ of coincidence detection circuit 25 the output of the D-FF 36 is locked "high" to lock the phase corresponding to the peak of the envelope.

When the playback operation is subsequently stopped, the FF 59 is inverted to "high" as mentioned earlier, and it holds this "high" state until the power source is reclosed after it is once opened or until the resetting means 47 is operated. Thus, even when playback operation is started again after a previous playback operation has once been stopped, the voltage $(+V)$ that prevails during playback is not supplied by the gate circuit 60 to the delay circuit 46, so that a "low" input is made to prevail at the logic circuit 37. Consequently, a "high" input prevails at the terminal 43 of the counter 38, and the counter is thus held inoperative and holds its previous count number that has been held in the previous playback operation. Since the previous count number corresponds to the phase C corresponding to the peak of the envelope, when playback operation is resumed the phase C can be immediately locked without the need for causing a phase shift between A and B. Thus, when resuming playback operation, locking of the phase C corresponding to the peak of the envelope can be obtained within the same period as the ordinary servo-system pull-in period.

In the preceding embodiment, it becomes impossible for the counter to hold the previous count number when the power source is disconnected. This inconvenience can be avoided with the construction of FIG. 1 using the analog memory 28.

What is claimed is:

1. A tracking control system for a magnetic video recording and reproducing system comprising:
   a tape drive means for driving a magnetic tape bearing an information signal recorded as record tracks at an angle with respect to the longitudinal direction of the tape and also bearing a control signal recorded along an edge of the tape in a predetermined positional relation to the record tracks;
   a rotary head drive means for driving rotary heads such that the record tracks on said magnetic tape are scanned by the heads;
   a peak hold circuit for holding a value substantially corresponding to the peak value of the envelope of a reproduced signal output from said rotary heads;
   an envelope detector circuit for obtaining the envelope of the reproduced signal output from said rotary heads;
   a detecting means for producing a detection signal when the outputs of said peak hold circuit and of said envelope detector circuit are identical to each other;
   a phase signal generating means for producing a phase signal representing the rotational phase of said rotary heads;
   a control signal reproducing head for reproducing said control signal;
   a phase adjustment circuit responsive to the output of said phase signal generating means for controllably shifting the phase of said phase signal in accordance with a phase control signal added thereto;
   a phase comparator means for comparing the phases of the phase signal from said phase signal generating means and the control signal reproduced by said control signal reproducing head, either one or both of said signals being coupled to said comparator means through said phase adjustment circuit;
   means for controlling either said tape drive means or said rotary head drive means according to a signal corresponding to the phase difference between both input signals to said comparator means so as to vary the positional relation between the scanning tracks of said rotary heads and the record tracks on said magnetic head;
   a phase adjustment circuit control means for generating said phase control signal to be added to said phase adjustment circuit, said phase control signal varying its phase at a constant cycle so that the phase of said phase signal is varied periodically, said phase adjustment circuit control means including a locking means for locking said phase adjusting means in accordance with the detection output of said detecting means so that said phase control signal is held to the phase at the instant of receipt of said detection output.

2. The tracking control system according to claim 1, wherein said system further includes means for preventing the transmission of said detection output of said detecting means to said locking means for a predetermined period required from the commencement of playback operation until the operation of said tape drive means and also until said rotary head drive means is stabilized.

3. The tracking control system according to claim 1, wherein said phase adjustment circuit control means comprises a counter functioning to repeat a cycle of up-counting a clock pulse signal up to a predetermined value and then down-counting to the initial null state, and means for coupling the count output of said counter as a control signal to said phase adjustment circuit.

4. The tracking control system according to claim 3, wherein the control signal reproduced by said control signal reproducing head is used as said clock pulse signal.

5. The tracking control system according to claim 1, which further comprises a decrease detecting means to detect that the envelope of the reproduced signal has decreased after reaching a peak value and a means to control said phase adjustment circuit control means according to the output of said decrease detecting means so as to reverse the direction of shifting of the phase of said phase adjustment circuit.

6. The tracking control system according to claim 5, wherein said decrease detecting means comprises a comparator receiving as inputs the outputs of said peak hold circuit and of said envelope detector circuit, the output of said comparator being inverted when the difference of both said inputs reaches a predetermined threshold value.

7. The tracking control system according to claim 6, wherein said comparator has a hysteresis characteristic.

8. The tracking control system according to claim 1, further comprising means for selectively resetting said phase adjustment circuit control means, wherein said holding means is adapted to maintain its holding state until a power source for the system is disconnected or until said selectively resetting means is actuated.

9. The tracking control system according to claim 8, wherein said selectively resetting means is provided to further permit said peak hold circuit to discharge.

* * * * *